INVENTORS
DANTE S. GIARDINI &
RICHARD N. RONEY
BY
Edward T. Welsh
THEIR ATTORNEY United States Patent Office 3,172,240
Patented Mar. 9, 1965

3,172,240
MACHINE TOOL HYDRAULIC SYSTEM
Dante S. Giardini and Richard N. Roney, Dayton, Ohio, assignors to The Sheffield Corporation, Dayton, Ohio, a corporation of Delaware
Filed Dec. 13, 1962, Ser. No. 244,470
6 Claims. (Cl. 51—3)

This invention relates to infeed systems and more specifically to hydraulic infeed systems for a machine tool.

One object of the invention is to provide a machine tool hydraulic system capable of positive infeed with great accuracy.

Another object of the invention is the provision of an efficient hydraulic system for a machine tool capable of rapid traverse and slow precise positive feed.

Still another object of the invention is to provide a grinding machine hydraulic system wherein the grinding wheel is hydraulically moved with precision at fast and slow controlled rates into peripheral pressure contact with a crusher having a desired form for dressing thereof.

A further object of the invention is to utilize the same hydraulic system components in a grinding machine for controlled infeed during grinding and during crushing.

Another object of the invention is the provision in a system of the character mentioned, of means for accurately controlling depth of grinding and depth of crushing.

Another object of the invention is the provision in a hydraulic system having a hydraulic fast traverse, of a hydraulic pump having flow characteristics which provide an accurately controlled slow feed.

Figure 1:
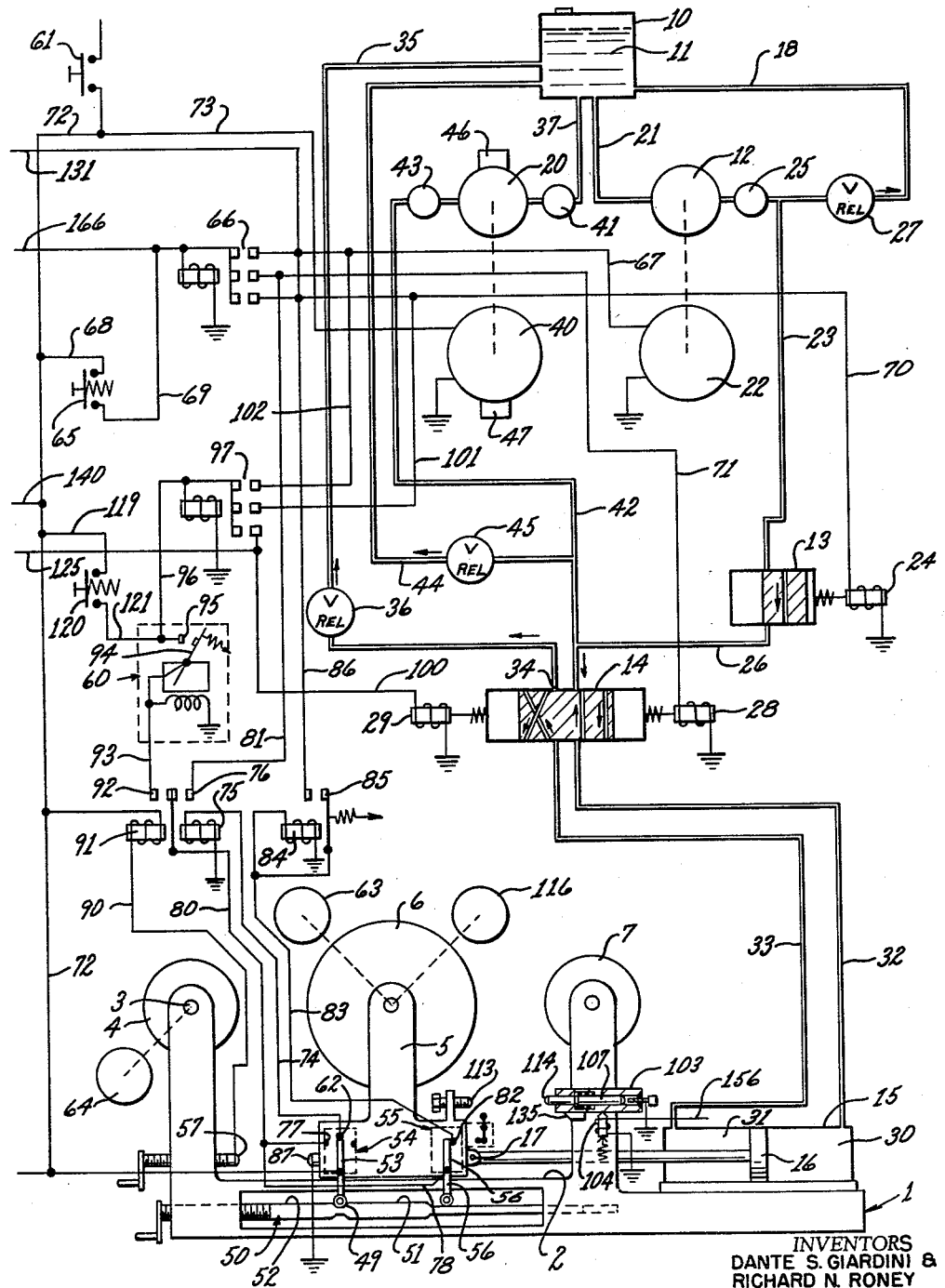

Other objects and advantages of the present invention will be apparent from the following description, the appended claims, and the accompanying drawings, in which, FIG. 1 is a schematic diagram of a grinding machine embodying the present invention showing the mechanical components and electrical circuitry for the grinding cycle.

Figure 2:
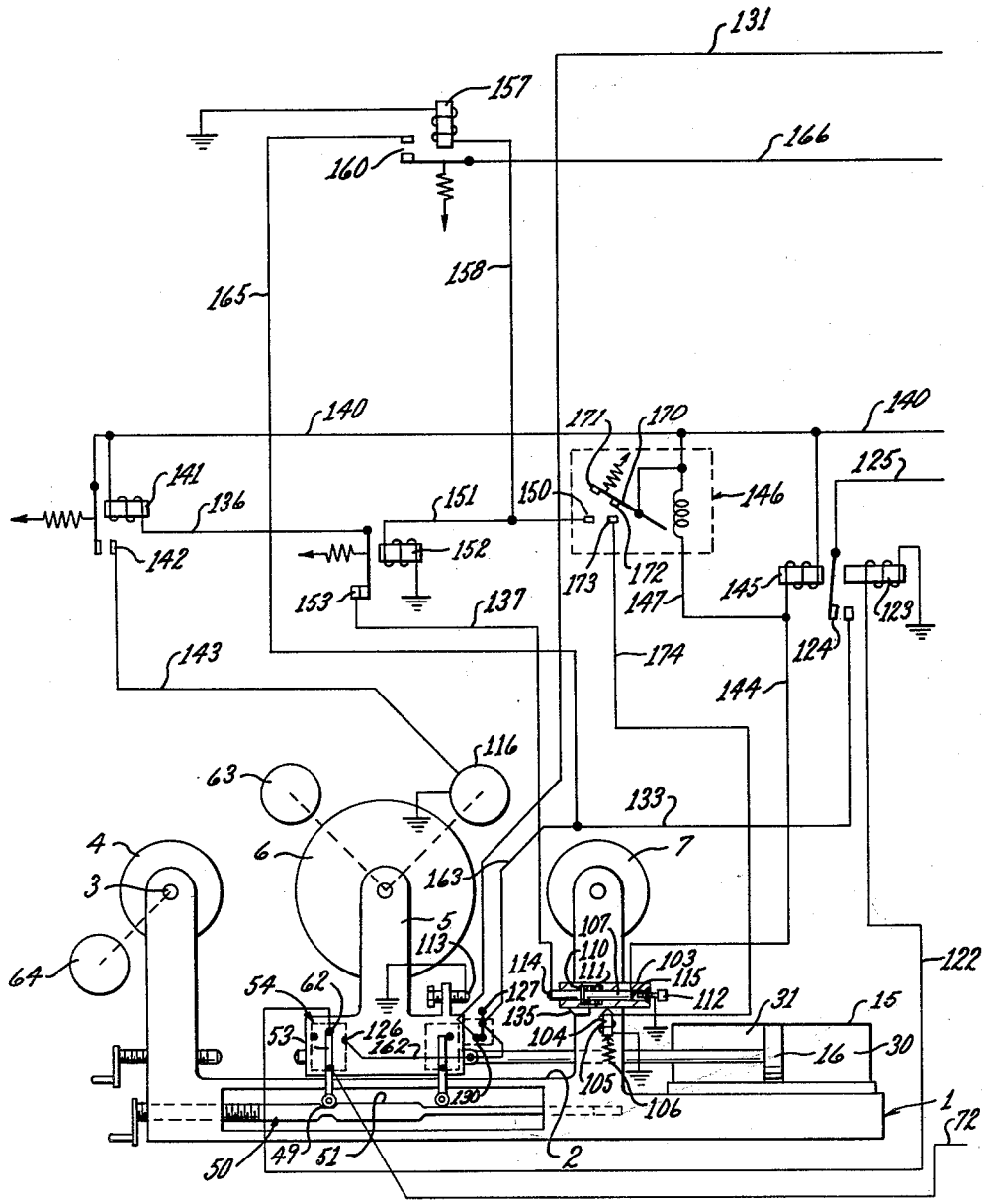

FIG. 2 is a schematic diagram of the machine showing the electrical circuitry for the crushing cycle and its correlation with the components of FIG. 1.

In the illustrated embodiment of this invention, a grinding machine 1, shown in FIG. 1, is provided having a base 2, centers 3 for carrying a workpiece 4, and a slide 5 movably mounted on the base for carrying a rotatable grinding wheel 6 back and forth on the base. The grinding wheel is moved in one direction to contact the workpiece mounted on said centers to impart a desired form therein and moved in an opposite direction to contact a crusher roll 7 mounted on the base to dress the grinding wheel.

The slide and grinding wheel is moved by the direct action of a hydraulic system acting thereon to accomplish the following basic steps: rapid traverse from a neutral position toward the workpiece until the grinding wheel is in close proximity thereto, slow positive feed of the grinding wheel into the workpiece a predetermined distance and then stopping the slow feed, a timed dwell period at the extreme forward position to finish grind the workpiece, rapid traverse of the slide and grinding wheel in the opposite direction to the neutral position. As occasions arise for retrueing the grinding wheel the same basic steps are followed and the wheel is moved in the opposite direction from the neutral position into the crusher roll and retrued.

The hydraulic system comprises a hydraulic reservoir 10 containing a hydraulic liquid 11. The liquid is supplied to a hydraulic rapid traverse pump 12 which flows the liquid through a shut-off valve 13 and through a selector valve 14 to a body member shown as a cylinder 15 attached to the base. The cylinder has a movable piston 16 therein which has an operable connection 17 with the slide for movement of the slide back and forth. A fine feed pump 20 supplied with liquid from the reservoir is connected to the selector valve and supplies liquid to the movable piston during rapid traverse and during fine feed.

During the rapid traverse cycle, the rapid traverse pump with a high output volume operates simultaneously with the fine feed pump to supply hydraulic fluid to the movable piston thereby moving the piston and connected slide at fast speed. When the grinding wheel is in close proximity to either the workpiece or the crusher, depending upon whether a grinding or crushing operation is being performed, flow from the rapid traverse pump is stopped allowing the fine feed pump to continue supplying liquid to the piston causing the slide and grinding wheel to advance at a slow positive feed rate. The rate of travel at slow speed is controlled by controlling the output volume of the fine feed pump. Upon reaching a predetermined depth, represented in one direction by the depth of cut desired in the workpiece and in the other direction by the depth the grinding wheel is to be crushed and dressed, flow from the fine feed pump to the piston is stopped and simultaneously a timer in the electrical circuit is energized to cause the wheel to dwell a set time in the forward position and finish grind, or crush, as the case may be. At the end of the time period, the timer also operates to energize the electrical circuit to rapidly traverse the slide and grinding wheel in the opposite direction to the neutral position.

Hydraulic liquid flows from the reservoir through a conduit 21 to the rapid traverse pump 12 which is driven by an electric motor 22 and is conveyed through another conduit 23 to the shut-off valve 13 which is actuated by solenoid 24. A hydraulic filter 25 is installed in conduit 23. Liquid from the rapid traverse pump flows through a conduit 26 from the shut-off valve to the selective valve 14 and then to the cylinder to traverse the piston at fast speed. The rapid traverse pump has an output volume generally of the order of 5 gallons of liquid per minute.

At the completion of the rapid traverse cycle previously described flow from the rapid traverse pump is stopped by the shut-off valve 13 and by shutting off the electric motor 22. In the event flow is restricted due to some obstruction or malfunction downstream of the rapid traverse pump, a pressure relief valve 27 returns the liquid in conduit 18 to the reservoir 10.

Flow from the selector valve enters the cylinder 15 in either a first liquid chamber 30 on one side of the piston 16 or a second liquid chamber 31 on the other side of the piston depending upon which direction the piston is to be moved. The selector valve is connected to the cylinder by a conduit 32 connected to chamber 30, and a conduit 33 connected to chamber 31. In the preferred embodiment of this invention the direction of movement of the piston, and hence of the connected slide and grinding wheel, is controlled by actuating a solenoid 28 or 29 which are attached to the selector valve 14. Each solenoid operates to position a different set of internal passages in a movable spool in the selector valve to determine which chamber in the cylinder receives flow from the valve. With both solenoids deenergized, springs in the valve position the spool to a center or closed position. In addition the internal porting of the selector valve is arranged to cause hydraulic flow to always exit the valve at one port 34 and return to the reservoir through a conduit 35. A pressurizing valve 36 is installed in this conduit to impose a back pressure on the piston during motion of the piston in either direction.

Hydraulic liquid flows from the reservoir through a conduit 37 having a filter 41 installed therein to the fine feed pump 20 driven by an electric motor 40. The liquid flows out of the fine feed pump through a conduit 42, having another filter 43 in the conduit, to the selector valve. In the event flow from the fine feed pump is stopped due to an obstruction downstream of the pump or due to closing the selector valve, flow from the fine feed pump returns to the reservoir through a conduit 44 which has a pressure relief valve 45 installed therein. Pressure relief valve 45 is set to relieve at about 400 pounds per square inch with the fine feed pump normally delivering at a discharge pressure which is considerably less.

The fine feed pump 20 is preferably a variable displacement type positive displacement pump with constant delivery under any setting adjustment to provide a controlled uniform rate of feed. The delivery of the pump is varied to control the rate of travel of the slide and hence the grinding wheel at slow positive speed. This rate of travel is determined by composition of the workpiece, complexity of the configuration to be ground, characteristics of the grinding wheel, and other factors. The delivery of the fine feed pump can be controlled precisely by external adjustment of a regulator 46 on the pump and an adjustable controller 47 on the fine feed pump drive motor 40 which varies the speed of the motor. The precise control of delivery from the fine feed pump introduces only that flow, during fine feed, which is desired to displace the piston at a predetermined rate of travel. The delivery of the fine feed pump is preferably generally of the order of one drop of liquid per second. This liquid is fed into one side or the other of the piston, depending upon which direction movement is desired, and provides movement of the slide by direct action of the hydraulic fluid being introduced against the piston.

The pressurizing valve 36 which is installed in conduit 35 imposes a predetermined back pressure against movement of the piston as the fine feed pump moves the piston at a slow positive feed rate. In one application of this invention the back pressure was set at about 60 pounds per square inch to help prevent erratic movement of the piston. In applications where precision is more important, the precise control of flow from the fine feed pump is also aided by the use of a high viscosity hydraulic liquid which may be of the order of 1,000 SSU. The high viscosity liquid prevents slippage of the fine feed pump during fine feed. Flow control is also aided by operating the pump at very low speed, even as low as a few revolutions per second or less.

A prevalent problem with machine tool hydraulic systems is erratic motion during infeed resulting in poor machining action during operation. Many of these hydraulic systems use what are commonly referred to as constant pressure systems which often employ pressure relief devices to by-pass flow around pumps at predetermined pressures resulting in cyclic by-passing of liquid to cause the erratic motion. In addition it is also common in these systems to use devices which operate to by-pass and use, through a small orifice, a small portion of the rapid traverse flow for fine feed while continually recirculating the larger amount of flow. This manner of recirculation is not efficient and heats the hydraulic liquid by the recirculatory pumping action. Heating the liquid also changes the liquid flow characteristics through the orifice to change the rate of infeed. The present invention eliminates these problems because only the required flow is pumped from the reservoir for fine feed and this flow is controlled with precision. As previously mentioned, it has been found that about a drop per second of hydraulic liquid from the fine feed pump will move the piston smoothly and positively.

Devices to control the operation of the hydraulic system are provided and include a cam rod 50 adjustably mounted on the base. The cam rod 50 has cam surfaces 51 and 52 which are engageable by a contact lever 53 pivotally mounted in a switch 54 attached to the slide 5.

The contact lever 53 engages the cam surfaces to actuate appropriate electrical circuitry to automatically control flow from the rapid traverse pump to the cylinder. Another switch 55 is also mounted on the slide and has a pivotally mounted contact lever 56 installed therein to stop flow from the rapid traverse pump when contact lever 56 engages cam surface 51. The cam rod 50 has a groove 49 which represents the previously mentioned neutral position. When the contact lever 53 is in cam groove 49 the slide is motionless.

An adjustable contact stop 57 is adjustably mounted on the base to limit travel of the slide during the grinding cycle by actuating the electrical system to stop flow from the fine feed pump, start a timer 60 which controls dwell time, and start rapid traverse of the slide away from stop 57 and toward the neutral position. During the dwell portion of the cycle the flow from the fine feed pump to the cylinder is stopped by closing the selector valve 14 causing relief valve 45 to return liquid flow from the fine feed pump to the reservoir after the oil system pressure increases to the setting of the relief valve.

Automatic grinding using this invention is commenced by energizing an on-off switch 61 which provides electrical current through a line 73 to start fine feed pump motor 40 driving fine feed pump 20. At this point the selector valve 14 is in a center or closed position causing the fine feed pump to increase pressure upstream of the selector valve until the pressure relief valve 45 opens to return flow to the liquid reservoir. A high speed motor 63 for driving the grinding wheel and a drive motor for the workpiece 64 are energized in any suitable manner. An automatic grind switch 65 is manually actuated to flow current through line 72 and a line 68 and 69 to momentarily energize relay 66 which simultaneously supplies electrical current through a line 67 to start the rapid traverse pump motor 22 driving the rapid traverse pump 12, supplies electrical current through a line 70 to energize solenoid 24 to open shut-off valve 13, and supplies current through a line 71 to energize a solenoid 28 to move the selector valve to a position causing liquid flow to enter cylinder 15 in chamber 30 and exit chamber 31 thereby moving the piston 16 and slide 5 to commence the grinding cycle. Energizing on-off switch 61 also supplies electrical current through a line 72 to contact point 62 in switch 54 through contact lever 53. Current flows from contact 62 through a line 74 to energize a latching relay 75 and make a contact 76 to provide a path, later in the cycle, for current to flow to the solenoid 28. Movement of the slide toward the workpiece location displaces contact lever 53 to engage cam surface 52 on cam rod 50 to complete a circuit at a contact 77 and permit current to flow through a line 80 and 81, and a contact 76 previously made, to solenoid 28 to keep the selector valve in the grind advance position. Contact 77 also provides current through a line 78 to contact lever 56 which is yieldingly urged against a contact 82 permitting flow of current through a line 83 to a coil 84 to close a contact 85, normally spring loaded open. Current flows from contact 85 through a line 86 and 67 to the rapid traverse electric motor 22 and through line 83, 86, and 70 to a solenoid 24. Closing contact 77 also keeps the rapid traverse pump motor energized and the shut-off valve open for rapid traverse as relay 66 was de-energized. The slide 5 continues in rapid traverse advance until the grinding wheel is within a fraction of an inch of the workpiece at which point contact lever 56 engages cam surface 51 on cam rod 50 which breaks contact at 82, de-energizes coil 84, and causes contact 85 to open. Opening contact 85 stops current flow to the rapid traverse pump motor 22 and to the shut-off valve solenoid 24 whereby the slide 7 continues at a slow positive feed rate toward and into the workpiece by flow provided from the fine feed pump 20 until the desired form has been ground in the workpiece. The advance movement of the grinding wheel is stopped by a contact 87 on the slide which engages stop 57 previously adjusted at the desired grinding depth. As contact 87 engages probe 57 an electrical circuit is completed through line 72 and a line 90 and a latching relay 91 to ground which breaks contact 76 de-energizing solenoid 28 and causing the selector valve to be spring returned to the center closed position. Energizing latching relay 91 also causes a contact 92 to be engaged supplying current through a line 93 to start electrical timer 60. The timer has a circuit which controls the time, following a grinding operation, and previously referred to as the dwell time to finish grind, required for a lever 94 in the timer to engage a contact point 95 which causes current to flow through a line 96 to energize a relay 97. Energizing relay 97 causes current to flow through a line 100 to solenoid 29 which moves the selector valve 14 to the grind retract position, causes current to flow through a line 101 and line 70 to energize solenoid 24 and open shut-off valve 13, and causes current to flow through a line 102 and line 67 to start the rapid traverse pump motor 22 driving pump 12. This enables the slide to retract rapidly from the workpiece until motion is stopped by contact lever 53 in switch 54 dropping in cam groove 49 of cam rod 50.

After automatic grinding the grind cycle may be repeated if desired. However, if it is necessary to dress the grinding wheel a cycle is started to bring it into peripheral pressure contact with the crusher roll.

The electrical apparatus for controlling depth of crushing is illustrated in FIG. 2 and comprises a housing 103 slidably mounted on the base 2 of the grinder and held by a solenoid 104. The solenoid has a plunger 105 which engages the housing and held in contact therewith by a spring 106. Energizing the solenoid overrides the spring force and permits the housing to be moved. The housing has a rod 107 slidable therein which is yieldingly urged toward the slide against a shoulder 110 in the housing by a spring 111. The rod is made of an electrical insulating material and has a metallic tip 114 at the end adjacent to the grinding wheel and another metallic tip 115 at the opposite end. An adjustable stop 112 is adjustably mounted on the housing to limit the distance the rod moves within the housing away from the shoulder. This distance is set to control the depth the grinding wheel will be crushed. During operation, after initiating the crushing cycle as will be presently described, an adjustable contact probe 113 on the slide engages tip 114 of rod 107 as the grinding wheel contacts the crusher roll. This completes a circuit through metallic tip 114 to ground and starts a grinding wheel slow motor 116 for crushing. As the grinding wheel continues to move into the crusher the rod 107 is displaced overriding spring 111 until the opposite tip of the rod 115 engages adjustable stop 112. As stop 112 is engaged an electrical circuit is completed to ground starting a timer 146 for the crush dwell cycle. Simultaneously solenoid 104 is energized releasing housing 103 causing spring 111 urging against contact probe 113 to displace the housing by the amount rod 107 was moved against spring 111. The solenoid is then de-energized allowing the plunger 105 to hold the housing in its new position. As this cycle is repeated the housing is automatically repositioned to the newly crushed depth.

To initiate the automatic crush cycle, the grinding wheel fast motor 63 and the workpiece drive motor 64 are de-energized. Automatic crush cycle switch 120 is manually actuated to flow current through line 72, and a line 119, 121, and line 96 to momentarily energize relay 97. Energizing relay 97 starts the rapid traverse pump motor 22 driving rapid traverse pump 12, energizes solenoid 24 to open shut-off valve 13, and energizes solenoid 29 to move the selector valve to a position causing liquid flow to enter the cylinder 15 in chamber 31 and exit chamber 30 thereby moving the piston 16 and slide 5 to commence the crushing cycle. Energizing on-off switch 61 also supplies current to contact point 62 through contact lever 53 which provides current through a line 122, illustrated in FIG. 2, to energize a latching relay 123 and make a contact 124 to provide a path, later in the cycle, for current to flow through a line 125 and line 100 to solenoid 29.

Movement of the slide toward the crusher causes contact lever 53 to engage cam surface 51 on cam rod 50 to close a contact 126 in switch 54. Contact at 126 provides current flow through a line 162, a contact lever 127, a line 133 to contact 124 previously made, and a line 125 to energize solenoid 29. Energizing solenoid 29 keeps the selector valve in the crush advance position after relay 97 is deenergized. Contact at 126 also provides current flow through line 162, contact lever 127, a contact 130, and a line 131 to the rapid traverse pump motor 22 and solenoid 24, to keep the rapid traverse pump motor running and to keep the shut-off valve 13 open respectively after relay 97 is de-energized.

The slide 5 continues in rapid traverse toward the crusher roll until the grinding wheel is within a fraction of an inch of the crusher at which point contact lever 127 is engaged by a cam surface 135 on the housing 103. The cam surface 135 causes the lever 127 to break contact at 130 to stop the rapid traverse pump motor 22 and de-energize the shut-off valve solenoid 24, whereby the slide 5 continues at a slow positive feed toward the crusher by flow provided by the fine feed pump. The slide continues at slow feed until contact probe 113 engages tip 114 of rod 107. This completes a circuit to ground through a line 140, 136 and 137 also energizes coil 141. Energizing coil 141 causes a contact 142 to close which supplies current through a line 143 to the slow speed grinding wheel motor 116 thereby rotating the grinding wheel at slow speed as it is brought in peripheral pressure contact with the crusher. The grinding wheel is crushed as it is fed slowly into the crusher roll.

As the slow feed continues probe 113 displaces rod 107 until tip 115 of the rod engages adjustable stop 112. This completes a circuit to ground through line 140 and a line 144 which energizes a latching relay 145 which opens previously closed contact 124 to de-energize solenoid 29 and cause the selector valve to be spring returned to the neutral position stopping slow feed. Simultaneously current flows through a line 147 to energize a timer 146 which controls the time the grinding wheel dwells in its extreme forward position in the crusher.

At the end of this dwell time, a contact lever 170 in the timer having a contact point 171 engages a contact 150. Contact 150 provides current flow through a line 151 to energize a coil 152 to break contact at 153 which de-energizes coil 141 and causes normally open contact 142 to open. Opening contact 142 stops the grinding wheel slow motor.

At the end of the dwell time and simultaneously with engagement of contact 150, a contact point 172 on contact lever 170 in the timer engages a contact 173. Contact 173 provides current flow through a line 174 to energize solenoid 104. Energizing solenoid 104 overrides the load of spring 106 to release housing 103 and causes the housing to be repositioned as previously described.

During contact at 150 current is supplied through a line 158 to energize a coil 157 and close a normally open contact 160. This completes a circuit from contact 126 in switch 54 through line 162, and a line 163, 165, and 166 to energize relay 66. Energizing relay 66 energizes solenoid 28 to move the selector valve and retract the slide from the crusher, energizes solenoid 24 to open shut-off valve 43, and starts the rapid traverse pump motor 22. The slide is thereby moved in crush reverse until the contact lever 53 in switch 54 drops in the cam groove 49 which is the neutral position and stops motion of the slide in preparation for another automatic cycle.

While the form of apparatus herein described constitutes a preferred embodiment of the invention it is to be understood that the invention is not limited to this pre-

What is claimed is:
1. In a machine tool having a movable member operable in a machining operation, a hydraulic system to control the movement thereof comprising,
  a reservoir containing a liquid supply,
  a body member,
  a piston movably supported in the body member and having an operable connection to the movable member, said body member having a fluid chamber on opposite sides of the piston,
  conduit means connected to the fluid chambers,
  valve means connected to the conduit means for selecting the chamber to receive liquid flow for movement of the piston in one direction and to receive flow from the opposite chamber,
  return conduit means connected to the valve means for returning fluid received from said opposite chamber to the supply reservoir,
  means for operating the valve means,
  a rapid traverse hydraulic pump with its inlet connected to the supply reservoir and its outlet connected to the valve means for supplying liquid thereto to rapidly traverse the piston,
  drive means for the rapid traverse pump,
  a fine feed hydraulic pump having an output volume which is extremely small compared to the rapid traverse pump and having its inlet connected to the supply reservoir and its outlet connected to the body member for supplying liquid flow thereto to move said piston at a slow positive feed rate,
  drive means for the fine feed pump,
  said conduit means including common junction means upstream of said fluid chambers receiving liquid flow simultaneously from said rapid traverse and fine feed pumps during rapid traverse movement of said piston and supplying such combined flow to the selected chamber,
  and means for stoping flow from said rapid traverse pump to said junction means during fine feed whereby fine feed movement of said piston is obtained through the continuing supply of liquid flow from said fine feed pump.

2. In a machine tool having a movable member operable in a machining operation, a hydraulic system to control the movement thereof comprising,
  a reservoir containing a liquid supply,
  a body member,
  a piston movably supported in the body member and having an operable connection to the movable member, said body member having a fluid chamber on opposite sides of the piston,
  conduit means connected to the fluid chambers,
  valve means connected to the conduit means for selecting the chamber to receive liquid flow for movement of the piston in one direction and to receive flow from the opposite chamber,
  return conduit means connected to the valve means for returning fluid received from said opposite chamber to the supply reservoir,
  a pressurizing valve in the return conduit means to maintain a predetermined pressure in said return conduit to thus provide resistance to movement of said piston in the desired direction and enable smooth uniform operation thereo,
  means for operating the valve means,
  a rapid traverse hydraulic pump with its inlet connected to the supply reservoir and its outlet connected to the valve means for supplying liquid thereto at a pressure greater than said predetermined pressure to rapidly traverse the piston,
  drive means for the rapid traverse pump,
  a fine feed hydraulic pump having an output pressure greater than said predetermined pressure and an output volume which is extremely small compared to the rapid traverse pump and having its inlet connected to the supply reservoir and its outlet connected to the body member for supplying liquid flow thereto to move the said piston at a slow positive feed rate against the back pressure created by said pressurizing valve,
  drive means for the fine feed pump,
  said conduit means including common junction means upstream of said fluid chambers receiving liquid flow simultaneously from said rapid traverse and fine feed pumps during rapid traverse movement of said piston and supplying such combined flow to the selected chamber,
  and means for stopping flow from said rapid traverse pump to said junction means during fine feed whereby fine feed movement of said piston is obtained through the continuing supply of liquid flow from said fine feed pump.

3. In a machine tool having a movable member operable in a machining operation, a hydraulic system to control the movement thereof comprising,
  a reservoir containing a liquid supply,
  a body member,
  a piston movably supported in the body member and having an operable connection to the movable member, said body member having a fluid chamber on opposite sides of the piston,
  conduit means connected to the fluid chambers,
  a selector valve connected to said conduit means and to the body member for selecting the chamber to receive liquid flow for movement of the piston in one direction and to receive flow from the opposite chamber,
  a return conduit connected to the selector valve for returning fluid received from said opposite chamber to the supply reservoir,
  a pressurizing valve in the return conduit to maintain a predetermined pressure in said return conduit to thus provide resistance to movement of said piston in the desired direction and enable smooth uniform operation thereof,
  means for operating the selector valve,
  a rapid traverse hydraulic pump with its inlet connected to the supply reservoir and its outlet connected to the selector valve for supplying liquid thereto at a pressure greater than said predetermined pressure to rapidly traverse the piston,
  drive means for the rapid traverse pump,
  a fine feed positive displacement hydraulic pump having an output pressure greater than said predetermined pressure and an output volume which is extremely small compared to the rapid traverse pump and having its inlet connected to the supply reservoir and its outlet connected to the selector valve for supplying liquid flow thereto to move the said piston at a slow positive feed rate against the back pressure created by said pressurizing valve,
  drive means for the fine feed pump,
  said conduit means including common junction means upstream of said selector valve receiving liquid flow simultaneously from said rapid traverse and fine feed pumps during rapid traverse movement of said piston and supplying such combined flow to said valve,
  and valve means in the portion of said conduit means leading solely from said rapid traverse pump and upstream of said junction means for stopping flow from said rapid traverse pump during fine feed whereby fine feed movement of said piston is obtained through the continuing supply of liquid flow from said fine feed pump.

4. In a machine tool having a movable member operable in a machining operation, a hydraulic system to control the movement thereof comprising,
a liquid supply reservoir,
a high viscosity liquid in the reservoir for use in the hydraulic system,
a body member,
a piston movably supported in the body member and having an operable connection to the movable member, said body member having a fluid chamber on opposite sides of the piston,
conduit means connected to the fluid chambers,
a selector valve connected to said conduit means and to the body member for selecting the chamber to receive liquid flow for movement of the piston in one direction and to receive flow from the opposite chamber,
a return conduit connected to the selector valve for returning fluid received from said opposite chamber to the supply reservoir,
a pressurizing valve in the return conduit to maintain a predetermined pressure in said return conduit,
an electrical device for operating the selector valve,
a rapid traverse hydraulic pump with its inlet connected to the supply reservoir and its outlet connected to the selector valve for supplying liquid thereto at a pressure greater than said predetermined pressure to rapidly traverse the piston,
an electric motor drive for the rapid traverse pump,
an electrical device for operating said shut-off valve,
a fine feed positive displacement hydraulic pump having an output pressure greater than said predetermined pressure and an output volume which is extremely small compared to the rapid traverse pump and having its inlet connected to the supply reservoir and its outlet connected to the selector valve for supplying liquid flow thereto to move the said piston at a slow positive feed rate against the back pressure created by said pressurizing valve,
an electric motor drive for the fine feed pump,
said conduit means including common junction means upstream of said selector valve receiving liquid flow simultaneously from said rapid traverse and fine feed pumps during rapid traverse movement of said piston and supplying such combined flow to said selector valve,
and shutoff valve means in the portion of said conduit means leading solely from said rapid traverse pump and upstream of said junction means for stopping flow from said rapid traverse pump during fine feed whereby fine feed movement of said piston is obtained through the continuing supply of liquid flow from said fine feed pump,
and control means operated by said movable member at predetermined positions thereof to control said electrical devices.

5. A grinding machine including a hydraulic system for providing precision movement of a grinding wheel comprising,
a base,
a grinding wheel crusher rotatably mounted on said base at a fixed position,
workpiece carrying means on said base,
a grinding wheel,
a slide rotatably supporting said grinding wheel,
means mounting said slide for rectilinear movement on said base to carry said grinding wheel toward the workpiece location during movement in one direction for grinding and toward said crusher during movement in the opposite direction for dressing,
a reservoir containing a liquid supply,
a body member,
a piston movably supported in the body member and having an operable connection to the slide, said body member having a fluid chamber on opposite sides of the piston,
a selector valve connected to the body member for selecting the chamber to receive liquid flow for movement of the piston in one direction for grinding and in the reverse direction for dressing and to receive flow from the opposite chamber,
a return conduit connected to the selector valve for returning fluid received from said opposite chamber to the supply reservoir,
a pressurizing valve in the return conduit to maintain a predetermined pressure in said return conduit,
means for operating the selector valve,
a rapid traverse hydraulic pump with its inlet connected to the supply reservoir and its outlet connected to the selector valve for supplying liquid thereto at a pressure greater than said predetermined pressure to rapidly traverse the piston and the connected slide to approach either said workpiece carrying means or said crusher as determined by said selector valve,
drive means for the rapid traverse pump,
means for stopping flow from the rapid traverse pump to said valve means after rapid traverse,
a fine feed positive displacement hydraulic pump having an output pressure greater than said predetermined pressure and an output volume which is extremely small compared to the rapid traverse pump and having its inlet connected to the supply reservoir and its outlet connected to one chamber or the other of the body member by the selector valve for supplying liquid flow thereto to move the said piston and the slide at a slow positive feed rate against the back pressure created by said pressurizing valve during both grinding and crushing operation,
drive means for the fine feed pump,
and control means operable by said slide for controlling said valves to control extent of travel at rapid traverse and at slow positive feed in both directions.

6. A grinding machine including a hydraulic system for providing precision movement of a grinding wheel comprising,
a base,
a grinding wheel crusher rotatably mounted on said base at a fixed position,
workpiece carrying means on said base,
a grinding wheel,
a slide rotatably supporting said grinding wheel,
means mounting said slide for rectilinear movement on said base to carry said grinding wheel toward the workpiece location during movement in one direction for grinding and toward said crusher during movement in the opposite direction for dressing,
a liquid supply reservoir,
a high viscosity liquid in the reservoir for use in the hydraulic system,
a body member,
a piston movably supported in the body member and having an operable connection to the movable support, said body member having a fluid chamber on opposite sides of the piston,
conduit means connected to the fluid chambers,
a selector valve connected to said conduit means and to the body member for selecting the chamber to receive liquid flow for movement of the piston in one direction for grinding and in the reverse direction for dressing and to receive flow from the opposite chamber,
a return conduit connected to the selector valve for returning fluid received from said opposite chamber to the supply reservoir,
a pressurizing valve in the return conduit to maintain a predetermined pressure in said return conduit to thus provide resistance to movement of said piston in the desired direction and enable smooth uniform operation thereof, an electrical device for operating the selector valve,
a rapid traverse hydraulic pump with its inlet connected to the supply reservoir and its outlet connected to the selector valve for supplying liquid thereto at a pressure greater than said predetermined pressure to rapidly traverse the piston and the connected slide to approach either said workpiece carrying means or said crusher as determined by said selector valve,
an electric motor drive for the rapid traverse pump,
an electrical device for operating said shut-off valve,
a fine feed positive displacement hydraulic pump having an output pressure greater than said predetermined pressure and an output volume which is extremely small compared to the rapid traverse pump and having its inlet connected to the supply reservoir and its outlet connected to one chamber or the other of the body member by the selector valve for supplying liquid flow thereto to move the said piston and the movable support at a slow positive feed rate against the back pressure created by said pressurizing valve during both grinding and crushing operation,
an electric motor drive for the fine feed pump,
said conduit means including common junction means upstream of said selector valve receiving liquid flow simultaneously from said rapid traverse and fine feed pumps during rapid traverse movement of said piston and supplying such combined flow to said selector valve,
and shutoff valve means in the portion of said conduit means leading solely from said rapid traverse pump and upstream of said junction means for stopping flow from said rapid traverse pump during fine feed whereby fine feed movement of said piston is obtained through the continuing supply of liquid flow from said fine feed pump,
and control means operated by said movable support at predetermined positions thereof to control said electrical devices.

References Cited in the file of this patent
UNITED STATES PATENTS

| | | |
|---|---|---|
| 2,051,052 | Morgan | Aug. 18, 1936 |
| 2,345,973 | Harrington | Apr. 4, 1944 |
| 2,367,758 | Decker et al. | Jan. 23, 1945 |
| 2,731,773 | Page | Jan. 24, 1956 |